Dec. 9, 1969  M. SHERBINSKY III, ET AL  3,482,555
INTERNAL COMBUSTION ENGINE VALVE SPRING ARRANGEMENT
Filed June 24, 1968  3 Sheets-Sheet 1

INVENTORS
MARK SHERBINSKY III
MILLARD J. LANE
Frederick J. Krubel
ATT'Y

Dec. 9, 1969    M. SHERBINSKY III, ET AL    3,482,555
INTERNAL COMBUSTION ENGINE VALVE SPRING ARRANGEMENT
Filed June 24, 1968    3 Sheets-Sheet 2
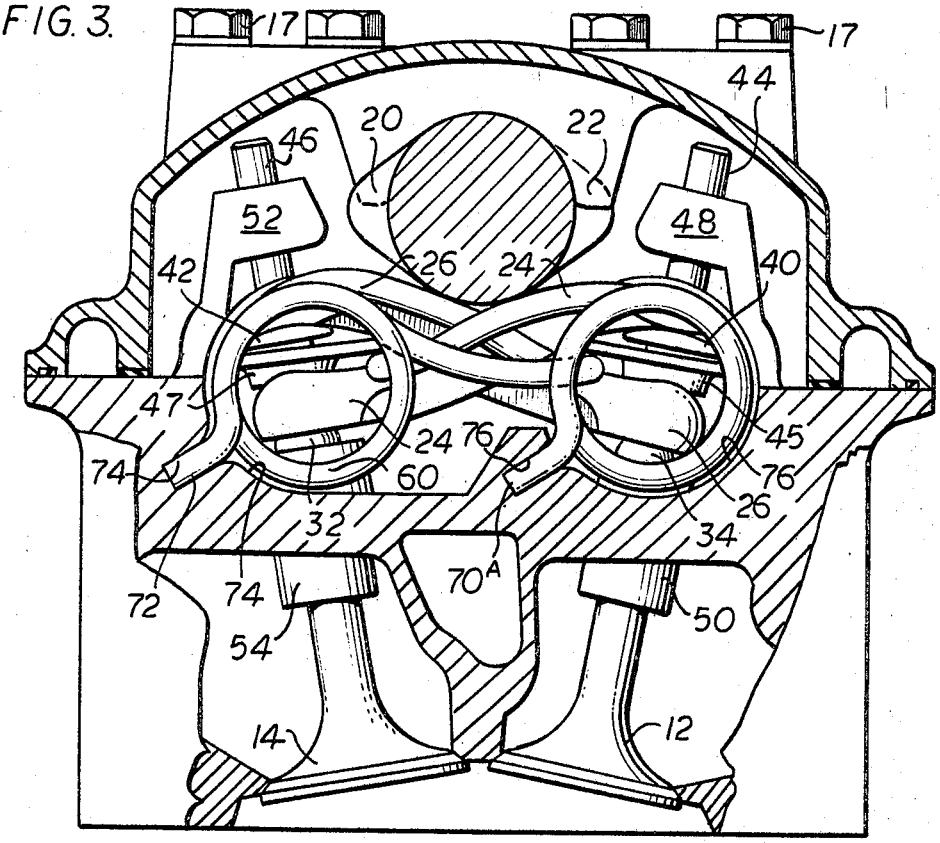
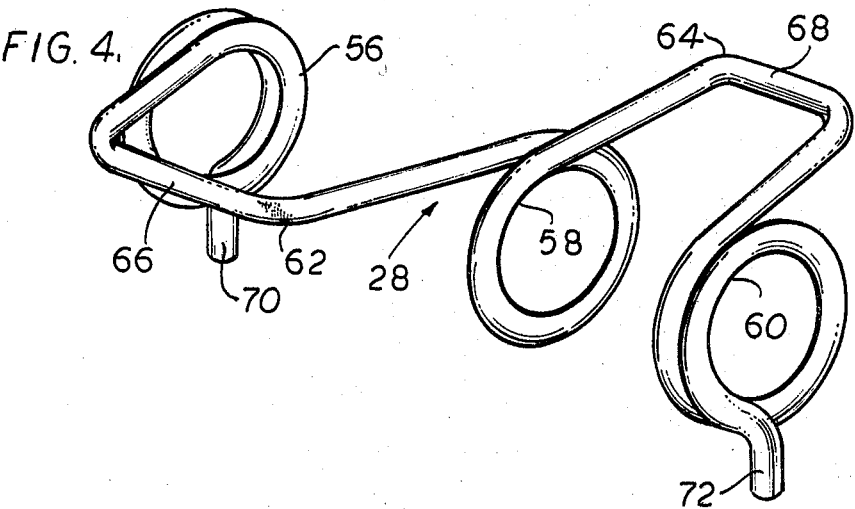
INVENTORS
MARK SHERBINSKY III
MILLARD J. LANE
Frederick J. Hauke
ATT'Y

INVENTORS
MARK SHERBINSKY III
MILLARD J. LANE
ATTY

United States Patent Office 3,482,555
Patented Dec. 9, 1969

3,482,555
INTERNAL COMBUSTION ENGINE VALVE
SPRING ARRANGEMENT
Mark Sherbinsky III, Fort Wayne, and Millard J. Lane, Columbia, Ind., assignors to International Harvester Company, Chicago, Ill., a corporation of Delaware
Filed June 24, 1968, Ser. No. 739,369
Int. Cl. F01l 1/00, 3/10, 1/14
U.S. Cl. 123—90                                                14 Claims

ABSTRACT OF THE DISCLOSURE

A valve spring means in an internal combustion engine wherein nested torsion springs associated with the engine valves are so constructed and so positioned with respect to the valves as to conserve space and thereby reduce the overall engine size.

---

This invention relates to internal combustion engines and more particularly to improved spring mechanisms used in conjunction with the inlet and exhaust valves.

In conventional engines utilizing compression springs in association with the inlet and exhaust valves considerable space is necessary to accommodate the spring arrangement. These compression springs usually are positioned at the upper part of the valve stem, the valve stem being made longer to accommodate the springs. This, of course, increases the overall height of the engine, an undesirable feature when space is at a premium for engine installation.

Accordingly, a principal object of this invention is to provide a spring arrangement in association with the engine valves which permits a considerable reduction in over-all engine height.

Another object is to provide torsion springs so constructed that they can operate on two valves and thus, doubling the material utilization of part of the spring.

A further object is to provide a nested arrangement of torsion springs resulting in a conservation of space.

Another object is to provide a valve operating assembly in which each valve is urged to a closing position by two spring elements.

The above and other objects and advantages of the invention will be more readily apparent when read in connection with the accompanying drawings in which:

FIGURE 3 is a partial elevation view in section taken along line 3—3 of FIGURE 1;

FIGURE 4 is a view in perspective of one of the valve springs shown in FIGURES 1 and 3;

Figure 1:
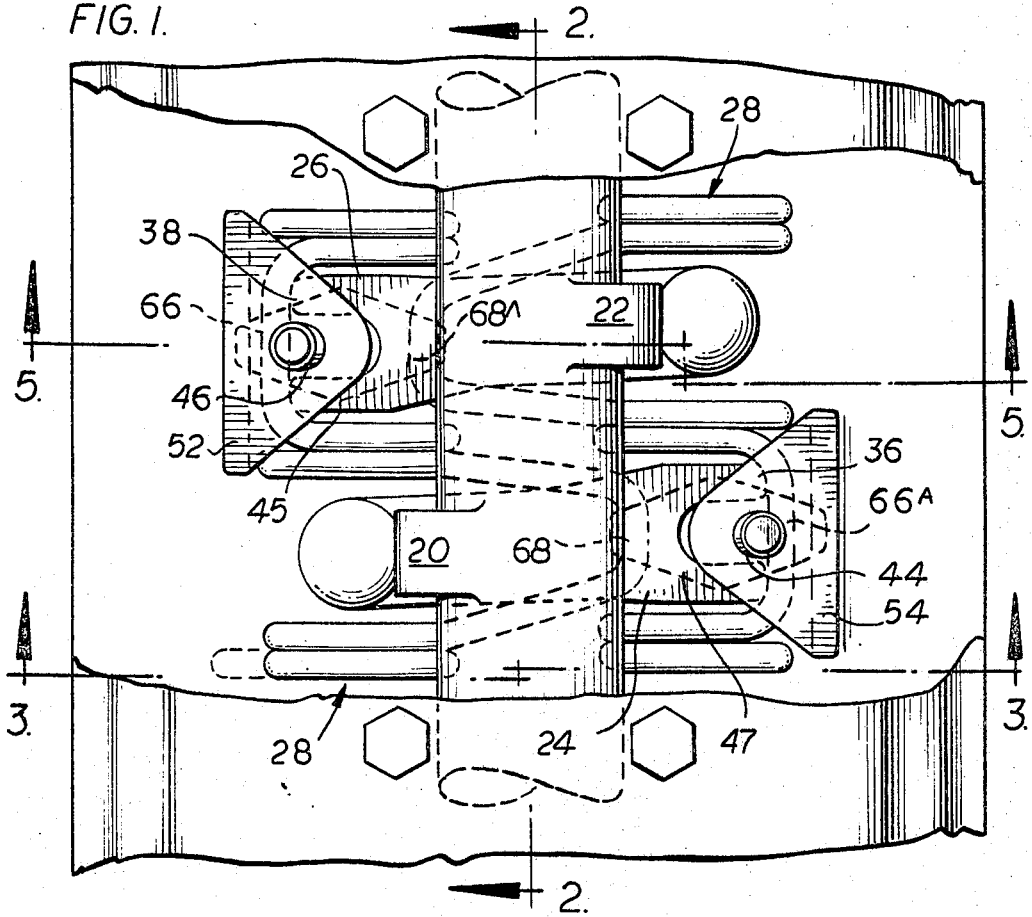
FIGURE 1 is a broken away plan view of a portion of an engine cylinder head showing two valves, the valve rocker arms, and associated spring arrangements.
Figure 2:
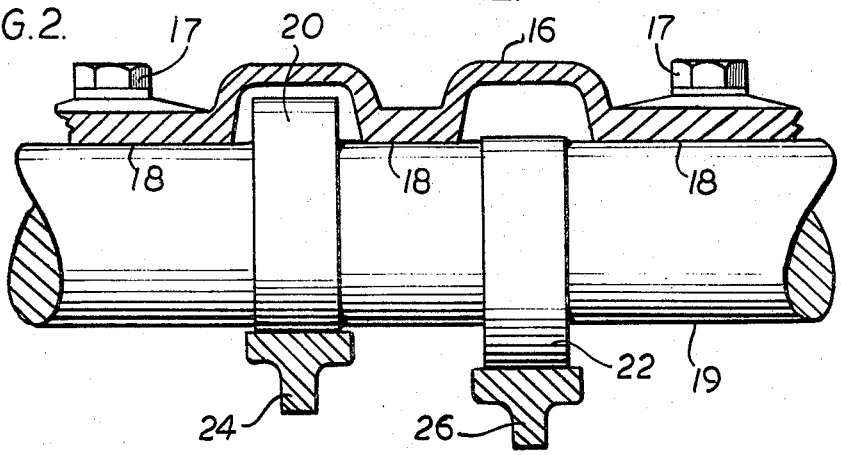
FIGURE 2 is a partial view in section taken along line 2—2 of FIGURE 1.
Figure 5:
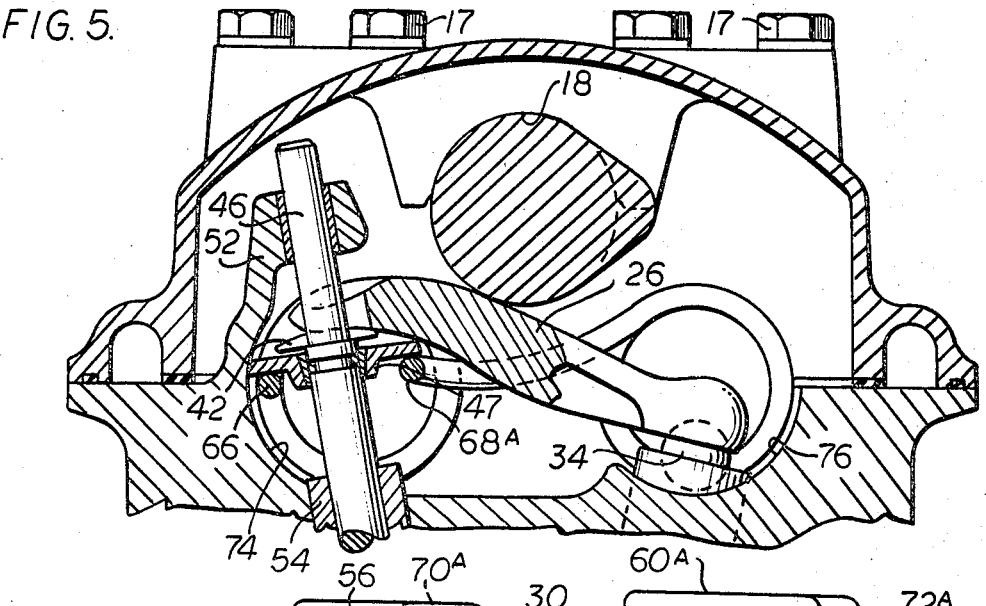
FIGURE 5 is a partial elevation view in section taken along line 5—5 of FIGURE 1.

Referring now to the drawings wherein like reference characters refer to similar parts there is shown an engine part 10 which is a portion of an engine cylinder head in which are disposed a plurality of inlet and exhaust valves. Two of these are shown as inlet valve 12 and exhaust valve 14 disposed for reciprocating movement in response to actuation by a cam shaft and valve spring mechanism. A valve cover 16 encloses the upper portion of cylinder head and is secured to the head by suitable means such as bolts 17. A plurality of bearing surfaces 18 may be provided in the cover 16 for guiding a cam shaft 19. Cam lobes of which two are shown in FIGURE 2 as 20 and 22 operate rocker arms such as 24 and 26 operatively connected to the valves 14 and 12. Spring members are included in the assembly to urge the valves to a closed position. Two such spring members are shown herein and designated by reference characters 28 and 30. The one end of rocker arms 24 and 26 may be positioned on ball pivots 32 and 34 respectively. The opposite end of rocker arms 24 and 26 are formed with bifurcated portions 36 and 38 respectively to engage the collars or flanges 40 and 42 attached respectively to valve stems 44 and 46 of valves 14 and 12. The flanges 40 and 42 act as bearing surfaces to receive the force of the ends of the rocker arms as they are pivoted downwardly by the lobes of the cam shaft acting intermediate the ends of the rocker arms.

Collars 45 and 47 are secured to valve stems 44 and 46 respectively in a manner well known in the art at a position just slightly below collars 42 and 40 and are adapted to be engaged by the spring members 28 and 30 as hereinafter more fully described.

The valve stem 44 of valve 12 is supported in the cylinder head for reciprocating sliding movement in upper and lower valve guides 48 and 50, and valve stem 46 of valve 14 is supported in the cylinder head for like reciprocating sliding movement in upper and lower valve guides 52 and 54.

Figure 6:
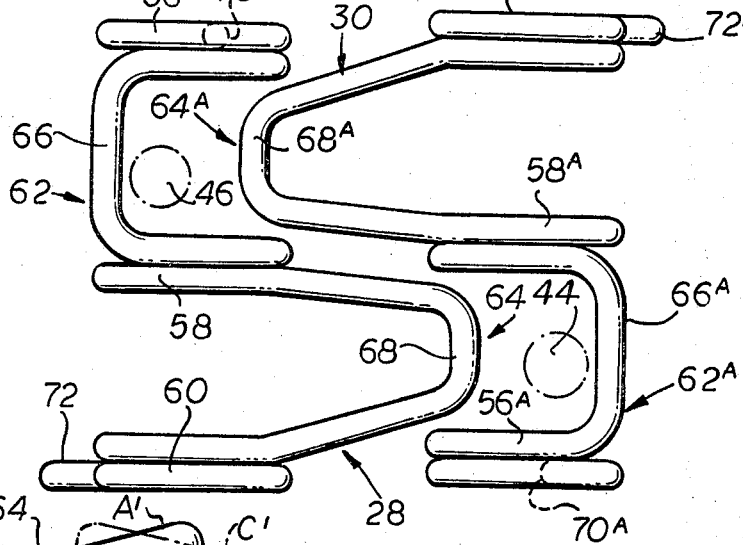
FIGURE 6 is a plan view of two nested valve springs.

The pair of spring members 28 and 30 are of the same configuration as most clearly seen in FIGURE 6 but are reversed in the assembly with respect to each other. Thus, only spring member 28 will be described in detail, corresponding parts of spring member 30 being designated with the same reference character plus the suffix a. The spring members are actually arranged in nested pairs in the assembly in the cylinder head. It will be apparent that there are as many spring members as there are valves. As will be evident from further description, each spring operates on two valves and each valve is actuated by arm members of two springs.

The spring member 28 is a resilient wire member formed into three spaced and substantially axially aligned coiled loop portions 56, 58 and 60. Two substantially U-shaped transversely extending arm member 62 and 64 interconnect the loop portions with the loop portion 58 being the internal coil or middle loop portion and loop portions 56 and 60 being the external coils. The internal coil 58 is connected to both arm members 62 and 64. The arm members 62 and 64 are formed with cross bar portions 66 and 68 respectively.

The external coiled loops 56 and 60 are formed with free ends or anchoring ends 70 and 72 respectively which are used to anchor the spring member 28 in the cylinder head. FIGURE 3, for example, shows the free end 72 of spring member 28 anchored in opening 74 in the cylinder head and free end 70a of spring member 30 anchored in opening 76. These anchoring ends function as reaction points when torque is applied to the spring arm members. The spring members 28 and 30 are pre-tensioned by proper positioning in anchoring recesses in order to give the desired lifting force on the valves.

The cylinder head 10 has formed therein a plurality of recesses 74 and 76 disposed on opposite sides of the cam shaft to accommodate the coils of the valve spring members.

The cross-bar portion 66 of spring member 28 and the cross-bar portion 68a of spring member 30 engage the underside of collar 47 which is attached to valve stem 46 of valve 14 to urge the latter to a closed position. The cross bar portion 66a of spring member 30 and the cross bar portion 68 of spring member 28 engage the underside of collar 45 which is attached to valve stem 44 of valve 12 to urge the latter to a closed position.

It will be observed from FIGURES 1, 3, 5 and 6 that cross bar portion 68 acts on the inwardly extending portion of collar 45 on valve stem 44, and cross bar portion 66a acts on the opposite and outwardly extending portion of collar 45. Likewise cross bar portion 68a acts on the inwardly extending portion of collar 47 on valve stem 46, and cross bar portion 66 acts on the opposite and outwardly extending portion of collar 47.

It will be observed that both the rocker arms and the arms of the spring members act on the valve stems along the central portion of the valve stems. This, of course, provides a more compact valve operating assembly and reduces the overall engine size, particularly the height. By comparison, compression springs positioned at the upper end of the valve stem in a manner well known in the art and a rocker arm acting on the upper end of the valve stem require considerably greater space than the valve assembly mechanism disclosed herein.

In operation valve 12 is opened by action of the lobe 20 of the cam shaft on rocker arm 24. The rocker arm 24 pivots downwardly on ball pivot 32 and acts on collar 40 secured to the valve stem 44. This action, of course, moves the U-shaped arm member 64 of spring member 28 downwardly and builds up the bending stress in the coils 58 and 60 of spring member 28. Because of the direction of winding of the coil 58, and arm member 62 associated with valve 14 exerts an upward or lifting force on valve 14 to thereby more strongly urge the latter to a closed position.

In addition, the downward or opening movement of valve 12 moves arm member 62a of spring member 30 downwardly increasing the bending stress in the coils 56a and 58a. As a consequence the arm member 68a exerts an additional lifting force on valve 14 through arm member 62.

As the cam shaft rotates to open valve 14, substantially the same sequence of events take place. In such case, the downward or opening movement of the valve 14 puts additional bending stress on the coils 58a and 60a of spring member 30 and on coils 56 and 58 of spring member 28. The arm member 62a associated with valve 12 then more strongly urges the latter to a closed position. The opening movement of valve 14 moves arm member 62 of spring member 28 to increase the bending stress of coil 58, and as a consequence the arm member 68 urges the valve 12 to a closed position with greater force.

Figure 7:
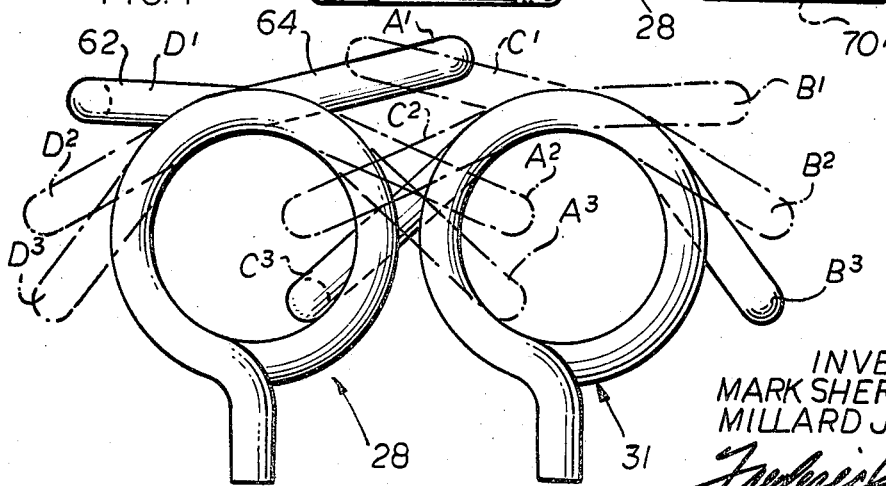
FIGURE 7 is a diagram showing relative positions of the two springs during various positions of their associated valves.

FIGURE 7 illustrates schematically how the arm members of the two springs 28 and 30 move in relation to each other during the reciprocating movement of the valves 12 and 14.

As valve 12, for example, is opening, arm 64 of spring member 28 moves from $a^1$ to $a^2$ to $a^3$, and at the same time arm 62a of spring member 30 moves from $b^1$ to $b^2$ to $b^3$. As valve 14 is opening arm 64a of spring member 30 moves from $c^1$ to $c^2$ to $c^3$ and arm 62 of spring member 28 moves from $d^1$ to $d^2$ to $d^3$.

It will be apparent that I have advantageously provided a valve operating assembly in an internal combustion engine which utilizes torsion spring valve actuators arranged in nested pairs. The springs are positioned in relation to the valves to conserve space and thereby reduce the overall size of the engine.

While a preferred embodiment of the invention has been disclosed, it is to be understood that the invention is not limited thereto as other variations will be apparent to those skilled in the art.

We claim:

1. In an internal combustion engine the combination comprising:

valve means comprising at least two separate valves, means for actuating said valve means to an open position, a dual action torsion spring member for urging said valve means to a closed position, said spring means comprising three axially spaced coil portions, two arm members interconnecting said coil portions for operatively engaging said valve means, one of said coil portions being connected to both of said arm members, said torsion spring means being so constructed and arranged that when torsion is applied to one of said arm members through the movement of one of said valves toward an open position by said valve actuating means, torsional force will be transmitted to the other of said arm members and its associated valve to urge the latter to a closed position.

2. The combination of claim 1 wherein said arm members are of substantially U-shaped construction and extend in substantially opposite directions.

3. The combination of claim 1 wherein said two valves are axially spaced with reference to the axis of an associated cam shaft and disposed on opposite sides of said cam shaft axis.

4. The combination of claim 3 wherein said two arm members of said spring member comprise a long arm and a short arm, said long arm acting on one of said two valves and said short arm acting on the other of said two valves.

5. The combination of claim 1 including a second torsion spring member, said two spring members being of similar construction and positioned in nested relation with each other, each of said spring members having a long and a short arm member, said short arm member of each spring member acting on one of said two valves and said long arm of each spring member acting on the other of said two valves.

6. The combination of claim 1 including a second torsion spring member for urging said valve means to a closed position.

7. The combination of claim 6 wherein each spring member acts on two valves.

8. The combination of claim 6 wherein two spring members act on each valve.

9. The combination of claim 6 wherein each spring member acts on two valves, and two spring members act on each valve.

10. The combination of claim 1 wherein said means for actuating said valve means to an open position includes a rocker arm positioned between said coil portions of said spring member.

11. A torsion spring member adapted to be used in a valve operating assembly of an internal combustion engine comprising:

first, second and third axially spaced and substantially axially aligned coil portions, a first arm member interconnecting said first and second coil portions, said arm member being adapted to be operatively associated with a valve of an internal combustion engine, a second arm member interconnecting said second and third coil portions and extending in a direction substantially opposite to said first arm member, said second arm member also being adapted to be operatively associated with a valve of an internal combustion engine.

12. The torsion spring member of claim 11 wherein said arm members are of substantially U-shaped construction.

13. The torsion spring member of claim 11 including means for anchoring said first and third coil portions to apparatus with which said spring member is adapted to be associated.

14. The torsion spring member of claim 11 wherein said coils are constructed and arranged in a manner so that a torque biasing force is built up in one of said arms when the other of said arms is rotated in one direction and a torque biasing force is built up in the other of said arms when said one of said arms is rotated in the opposite direction.

References Cited

UNITED STATES PATENTS

| | | |
|---|---|---|
| 1,974,802 | 9/1934 | Chilton. |
| 2,824,554 | 2/1958 | Sampietro. |
| 3,060,916 | 10/1962 | Buchi. |
| 3,352,293 | 11/1967 | Hulten. |
| 3,358,659 | 12/1967 | Renger. |
| 3,430,614 | 3/1969 | Meacham. |

FOREIGN PATENTS

| | | |
|---|---|---|
| 659,049 | 4/1938 | Germany. |
| 511,012 | 8/1939 | Great Britain. |
| 522,998 | 7/1940 | Great Britain. |

AL LAWRENCE SMITH, Primary Examiner

U.S. Cl. X.R.

123—188, 193; 267—1